July 21, 1931.  A. J. DOWD  1,815,245
COIL AND METHOD OF MANUFACTURING COILS
Filed Jan. 5, 1929
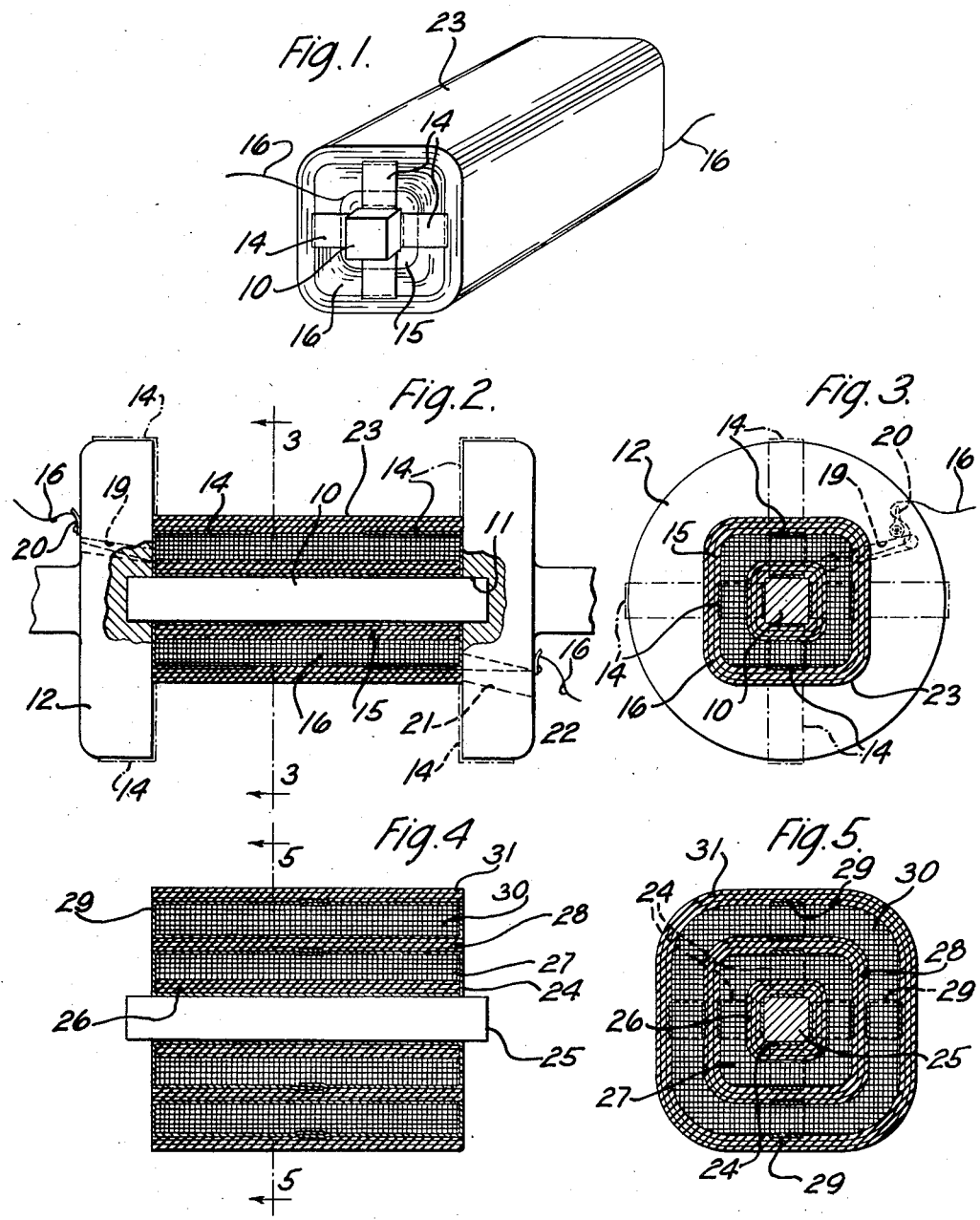

Patented July 21, 1931

1,815,245

UNITED STATES PATENT OFFICE

ARCHIE JOSEPH DOWD, OF MAPLEWOOD, NEW JERSEY, ASSIGNOR TO WESTERN ELECTRIC COMPANY, INCORPORATED, OF NEW YORK, N. Y., A CORPORATION OF NEW YORK

COIL AND METHOD OF MANUFACTURING COILS

Application filed January 5, 1929. Serial No. 330,599.

This invention relates to coils and methods of manufacturing coils, and more particularly to an electrical coil and a method of manufacturing it.

In the manufacture of certain types of electrical coils, particularly of the form wound, headless core type, such as are used in systems for the transmission of intelligence telephonically, it is the practice in some instances to wind the coil on a dismantable form and then impregnate the coil while upon the form, in some binding compound to retain the wound coil in proper shape after its removal from the form. This method of forming coils requires a relatively large number of forms for a given production, and difficulty may be encountered in removing the impregnated coil from the form which, of course, must be cleaned after each use. Furthermore, impregnated coils in some uses become heated to an extent that the compound flows, which condition may, in some instances, result in the separation of the coil windings sufficiently that the coil becomes defective.

The objects of this invention are a durable, efficient and substantial coil which may be produced in an economical manner, and its method of manufacture.

In order to attain these objects in accordance with the features of this invention as applied, for the purpose of disclosure, to a simple coil of a single conducting winding, a plurality of lengths of strand or the like, at the start of the winding operation, are secured along the peripheral surface of a core, which is secured between temporary heads during the winding operation with the ends of the strands projecting from each end of the core. The coil is then wound, an inner cotton serving or other insulating material first being wound directly over the strands and thereafter the wire forming the coil permanently wound thereover upon the core. Before the usual outer cotton serving or other insulating material is wound over the winding, the projecting ends of the strands are turned inwardly around the ends of the wound coil and laid upon the outer peripheral surface thereof, and thereafter the outer serving is wound over the coil with the ends of the strands held down and interconnected by the serving to maintain the shape of the coil or the strand ends may be secured by the outer layer of the conducting winding itself.

Other objects and advantages of this invention will more fully appear from the following detailed description taken in connection with the accompanying drawings, wherein Fig. 1 is a perspective view of an electrical coil embodying the features of and wound in accordance with the improved method of this invention, Fig. 2 is a longitudinal sectional view of the coil illustrated in Fig. 1 before its removal from between temporary heads, shown partially in section, used during the winding operation.

Fig. 3 is a vertical section taken on the line 3—3 of Fig. 2,

Fig. 4 is a longitudinal section view of a coil embodying a primary and a secondary winding, and Fig. 5 is a sectional view taken on the line 5—5 of Fig. 4.

Referring now to the drawings in detail wherein similar reference numerals indicate like parts throughout the several views, a core 10, in the present instance square in cross-section, is supported at either end in complementary depressions 11 provided in opposed faces of temporary heads 12. The heads 12 may be mounted on a coil winding machine in place of the usual spool driving elements thereof, one of the heads being secured to the rotary winding spindle, while the other head is rotatably and reciprocally mounted so that at the beginning of the winding operation it permits the ends of the core 10 to be entered in the depressions 11 of the heads and thereafter clamps the core therebetween, and upon completion of the coil permits its removal.

After positioning the core 10 a plurality of strands which may be in the form of tapes or strings 14 are positioned longitudinally along the core, in the present instance a tape is mounted along each face of the core 10 at each end thereof (Fig. 2). The outer ends of the tapes 14 project beyond the ends of the coil to be wound and are laid along the opposed faces of the heads 12 as shown in dotted lines (Figs. 2 and 3), are bent outwardly at the periphery thereof, and are of a length that upon completion of the winding operation they may be turned inwardly and laid upon the periphery of the outer layer of winding as clearly shown in Figs. 2 and 3. The tapes instead of being bent outwardly as indicated, may project through the heads 12. To retain the tapes 14 in position upon the core 10 and the heads 12, during the winding operation, they may be lightly pasted or secured in any other suitable manner thereto. The core 10, between the opposed faces of the heads 12, is usually insulated with a cotton serving or other insulating material 15.

Thereafter the inner end of a winding material 16 is threaded through an aperture 19 formed in either head 12 and secured thereto as by means of a spring clip 20 attached to the outer face thereof with a suitable length of the winding material projecting to provide for terminal purposes. The usual winding of the coil is now started and upon completion thereof the outer end of the winding material 16 is threaded through an aperture 21 (Fig. 2) formed in either head 12 and like the inner end of the material may be secured to a spring clip 22 upon the outer face of the head with a suitable length of material projecting to provide for terminal purposes. Preferably, the apertures 19 and 21 are formed in the left and right hand heads 12, respectively, at points in radial alignment with the diametrically opposite corners of the depressions 11 and the core 10 so that there is no interference with the tapes 14 previously positioned on the core 10 and heads 12. The aperture 21 is elongated in a direction at an angle to the axis of the head 12 (Fig. 2) so that the winding material 16 may be threaded directly therethrough with different coil diameters.

With the completion of the winding upon the core 10, which is permanently wound thereon, the projecting ends of the several tapes 14 are released from the peripheral face of the heads 12 and turned inwardly over the ends of the wound coil and laid upon the outer peripheral surface thereof and thereafter an outer cotton serving 23 similar to the inner serving 15, previously mentioned is wound on the coil over the tapes 14 and interconnecting them. The serving provides an insulating cover for the coil. The inner and outer ends of the winding are now released from the clips 20 and 22, the right head 12 is disengaged from the core 10 by moving it toward the right sufficiently to permit the coil formed of a permanent assemblage of elements to be removed from between the heads 12, the ends of the winding freely passing through the apertures 19 and 21. Thereafter the wound coil may be impregnated in some suitable binding compound to make it impervious to moisture and at the same time prevent the outer insulating covering from unwinding.

Although in Figs. 2 and 3 separate tapes 14 are illustrated as being positioned along each face of the core 10 at either end thereof, it will be apparent that a single tape may be used with equally good results. Also that the number of tapes 14 circumferentially spaced around the coil may be varied and still be effective to maintain the coil in proper shape after its removal from between the heads 12. Furthermore, the inwardly turned outer ends of the tapes 14 need not necessarily be held down and interconnected by the outer serving 23, since they may be held down equally well with the outer layers of the winding material 16.

In Figs. 4 and 5 there is shown a type of coil consisting of a primary and a secondary winding. This type of coil is wound in a manner similar to that described in connection with the coil illustrated in Fig. 1, except that two windings are provided. Each of these windings; that is, the primary and secondary windings, is separated and held together by means of tapes, as is also true of the type of coil shown in Figs. 2 and 3. As illustrated in Fig. 4, several tapes 24 are laid longitudinally of a core 25. The tapes 24 may be secured to the core 25 in any suitable manner and may project through apertures or slots in the winding heads corresponding to those illustrated in Fig. 2. After the application of the tapes 24, a layer or two of insulating material 26 may be applied. Of course, the insulation 26 may be dispensed with and the winding material applied directly to the tapes 24, provided the extra insulation afforded by the insulation 26 is not required.

According to Figs. 4 and 5, an insulated conductor 27 is wound on the insulating material 26 in several superimposed, orderly arranged turns and layers. After a predetermined number of layers of the conductor 27 have been applied, the ends of the tapes 24 are bent inwardly and fastened either by cement or tying the ends thereof. Either shellac or amboid cement may be found particularly useful as a cementitious material. By binding the tapes 24 in the manner just described, the section of the coil now completed may be removed from the winding machine to a testing machine for the purpose of performing desired electrical tests to determine the electrical properties of the coil.

If the coil, as a result of these tests, is found satisfactory, it is replaced in the winding machine and several layers of insulating material 28 applied over the tapes 24. Additional tapes 29 are now laid on the insulation 28 in a manner similar to the arrangement of the tapes 24 on the core 25. The winding of the other coil, which may be referred to as the secondary coil, is now commenced by winding insulated conductor 30 on the tapes 29. After a predetermined number of turns and layers of the conductors 30 have been applied to the coil, the winding machine is stopped and the ends of the tapes 29 bent inwardly and fastened by using any one of the methods described with reference to the tapes 24. To complete the coil, several turns of insulating material 31 are applied over the tapes 29. The coil in this form, after having been tested to determine the electrical properties of the secondary winding, may be impregnated in a suitable compound in the manner described relative to the coil shown in Fig. 1.

From the foregoing description it will be apparent that durable and efficient coils of the form wound, headless core type may be produced in an economical manner.

Although the invention has been disclosed and described in connection with a particular type of coil, it will be understood that the invention is capable of application to other types of coils and is only limited by the scope of the appended claims.

What is claimed is:

1. An electrical coil comprising a core, a winding of conducting material permanently wound thereon, and a strand extending longitudinally of the core between the core and the winding and with its ends fastened intermediate the ends of the coil solely by the winding material, the whole forming a permanent assemblage of elements.

2. An electrical coil comprising a core, a winding of conducting material permanently wound thereon, and a plurality of strands circumferentially spaced around and extending longitudinally of the core between the core and the winding and outside the ends of the wound coil with the ends of the strands secured intermediate the ends of the coil solely by the winding material, the whole forming a permanent assemblage of elements.

3. An electrical coil comprising a core, a winding of conducting material permanently wound thereon, and a plurality of strands circumferentially spaced around and extending longitudinally of the core at each end thereof and between the core and the winding, the strands extending outside the ends of the wound coil with their ends turned inwardly over the peripheral surface of the winding and secured in position intermediate the ends of the coil solely by the winding material, the whole forming a permanent assemblage of elements.

4. An electrical coil comprising a core provided with a plurality of longitudinal faces, a winding of conducting material permanently wound thereon, a strand between each face of the core and the winding, the strands extending outside the ends of the wound coil and their ends turned inwardly over the peripheral surface of the winding and secured in position intermediate the ends of the coil solely by the winding material, the whole forming a permanent assemblage of elements.

5. The steps in the method of manufacturing electrical coils, which consist in mounting a strand upon a core, forming a permanent winding upon the core and over the strand with the ends of the strand extending outside the ends of the wound coil, and securing the ends of the strand intermediate the ends of the coil solely by means of the outer windings of the coil.

6. The steps in the method of manufacturing electrical coils, which consist in mounting a plurality of strands circumferentially spaced around and extending longitudinally of a core, forming a permanent winding upon the core and over the strands with the ends of the strand extending outside the ends of the wound coil, and securing the ends of the strands intermediate the ends of the coil solely by means of some of the windings of the coil.

7. The steps in the method of manufacturing electrical coils, which consist in mounting a strand upon a core, forming a permanent winding upon the core and over the strand with the ends of the strand extending outside the ends of the wound coil, turning inwardly the ends of the strand over the peripheral surface of the coil, and then forming an outer winding upon the first winding to interconnect the ends of the strand, and forming a cover for the winding.

8. The steps in the method of manufacturing telephone coils, which consist in mounting a plurality of strands circumferentially spaced around and extending longitudinally of a core at each end thereof, serving insulating material upon the core and over the strands, forming a permanent winding upon the insulating material with the ends of the strands extending outside the ends of the wound coil, turning inwardly the ends of the strand over the peripheral surface of the coil, and then serving insulating material thereover to interconnect the ends of the strands, and forming a cover for the winding.

In witness whereof, I hereunto subscribe my name this 24th day of December, A. D. 1928.

ARCHIE JOSEPH DOWD.